(12) United States Patent
Karlsson et al.

(10) Patent No.: US 8,107,266 B2
(45) Date of Patent: Jan. 31, 2012

(54) CONVERTER FOR CONVERTING ALTERNATING VOLTAGE INTO DIRECT VOLTAGE AND CONVERSELY

(75) Inventors: Patrik Karlsson, Ludvika (SE); Stellan Dahlgren, Ludvika (SE); Fabienne Chataignere, Ludvika (SE); Per-Olov Hedblad, Ludvika (SE)

(73) Assignee: ABB Technology Ltd., Zürich (CH)

( * ) Notice: Subject to any disclaimer, the term of this patent is extended or adjusted under 35 U.S.C. 154(b) by 635 days.

(21) Appl. No.: 12/161,585

(22) PCT Filed: Jun. 15, 2006

(86) PCT No.: PCT/SE2006/000716
§ 371 (c)(1),
(2), (4) Date: Nov. 2, 2008

(87) PCT Pub. No.: WO2007/084039
PCT Pub. Date: Jul. 26, 2007

(65) Prior Publication Data
US 2009/0303758 A1    Dec. 10, 2009

Related U.S. Application Data

(60) Provisional application No. 60/760,400, filed on Jan. 20, 2006.

(51) Int. Cl.
*H02J 3/36* (2006.01)

(52) U.S. Cl. ......................................................... 363/35
(58) Field of Classification Search .................... 363/35, 363/37, 38, 68, 126
See application file for complete search history.

(56) References Cited

U.S. PATENT DOCUMENTS

| | | | | |
|---|---|---|---|---|
| 3,496,445 A | * | 2/1970 | Lore et al. | 363/141 |
| 2008/0205093 A1 | * | 8/2008 | Davies et al. | 363/35 |

FOREIGN PATENT DOCUMENTS

| | | |
|---|---|---|
| RU | 2089986 C1 | 9/1997 |
| RU | 2002111927 A | 11/2003 |
| SE | 405053 | 2/1978 |
| WO | WO-90/16104 | 12/1990 |
| WO | WO-9522848 A1 | 8/1995 |

OTHER PUBLICATIONS

PCT/ISA/210—International Search Report—October 11, 2006.

* cited by examiner

*Primary Examiner* — Adolf Berhane
*Assistant Examiner* — Yemane Mehari
(74) *Attorney, Agent, or Firm* — Venable LLP; Eric J. Franklin

(57) ABSTRACT

A converter for converting alternating voltage into direct voltage and vice versa in a converter station of a high voltage transmission system including a series connection of a plurality of converter valves. The converter has connections to transformers on both of two opposite sides of the converter valves.

21 Claims, 3 Drawing Sheets

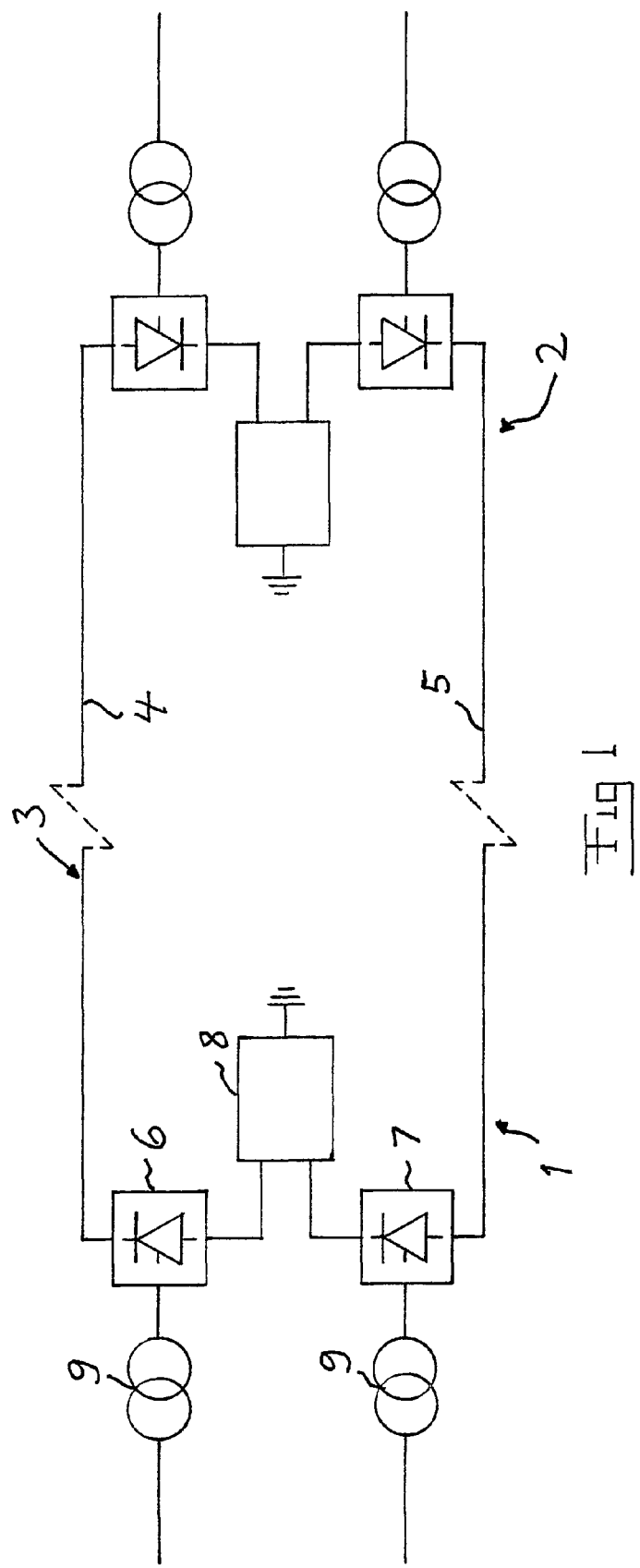

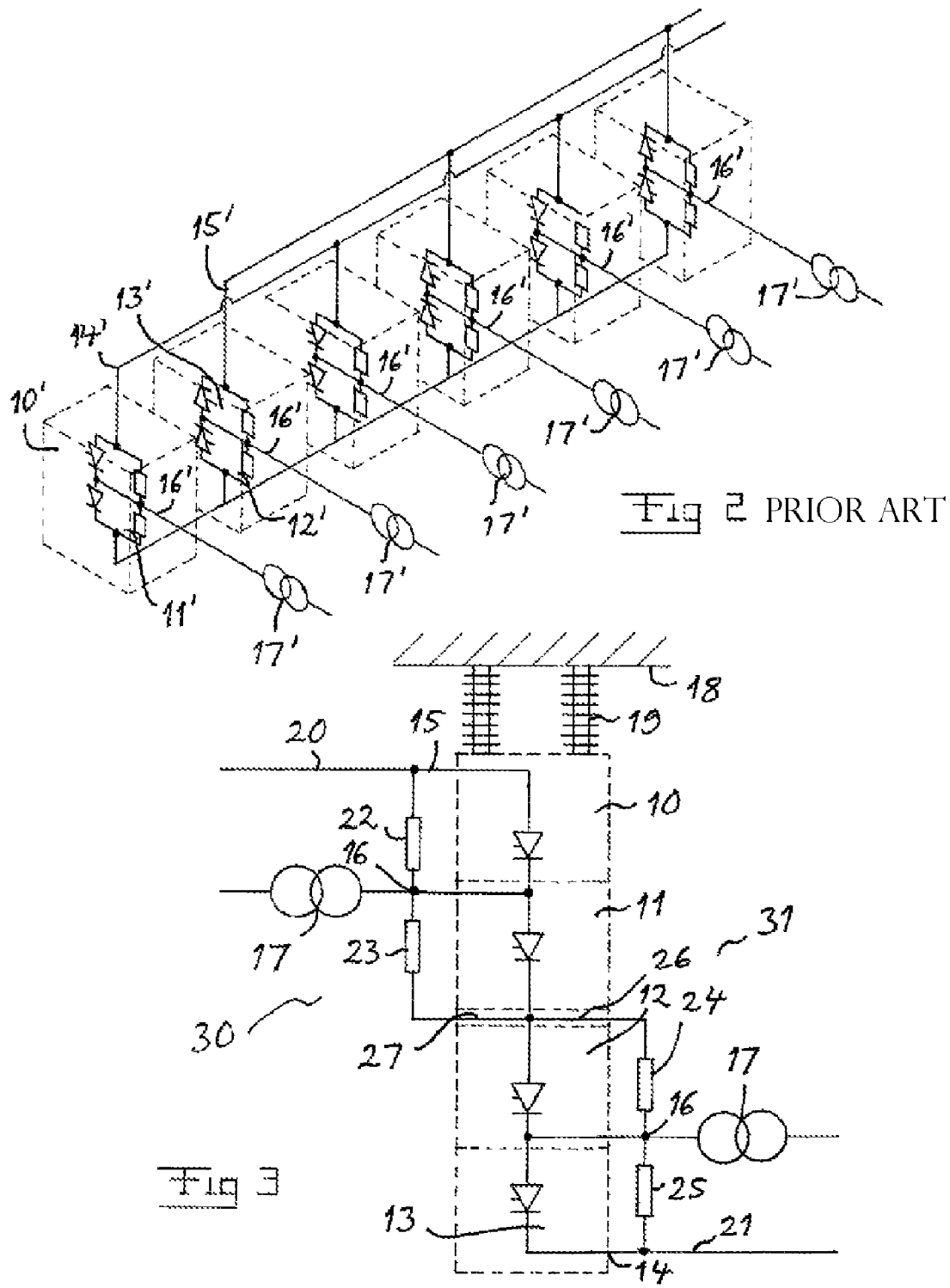

CONVERTER FOR CONVERTING ALTERNATING VOLTAGE INTO DIRECT VOLTAGE AND CONVERSELY

CROSS-REFERENCE TO RELATED APPLICATIONS

This application claims priority to U.S. provisional patent application 60/760,400 filed 20 Jan. 2006 and is the national phase under 35 U.S.C. §371 of PCT/SE2006/000716 filed 15 Jun. 2006.

TECHNICAL FIELD OF THE INVENTION AND PRIOR ART

The present invention relates to a converter for converting alternating voltage into direct voltage and vice versa in a converter station of a high voltage transmission system, said converter comprising a series connection of a plurality of converter valves, a DC-side of the converter being formed by opposite ends of said series connection of converter valves for connection to high potential and low potential, respectively, the converter further comprising a plurality of members connecting to an AC-side of the converter by each connecting to points of said series connection between subsequent said converter valves for leading out from the converter to transformers.

Said converter is a line commutated CSC (Current Source Converter) converter in which the switching elements, such as thyristors, are turned off at zero crossing of the AC current in said AC system. Each converter valve does normally have a number of such switching elements in the form of power semiconductor devices with rectifying diodes connected in anti-parallel therewith connected in series for being able to together hold the high voltage to be held by such a converter valve in the blocking state thereof.

The invention is particularly, but not exclusively, directed to converters for HVDC (High Voltage Direct Current) transmission systems and the invention will therefore be described for that application. When transmitting power in a direct voltage network connected to such a converter station it is desired to have a voltage being as high as possible, since the transmission losses are reduced when the voltage increases. Thus, it is an ongoing attempt to increase the voltage of the pole or poles of a transmission line or cable of such a transmission system with respect to earth. The present invention is particularly, but not exclusively directed to problems arising when said voltage is increased to high levels, especially, but not exclusively above 600 kV.

A converter of this type is normally a so called 12-pulse bridge converter, which means that it has 12 said converter valves in the form of three parallel series connections of four converter valves between said ends for connection to high potential and low potential. However, the invention is not restricted to such a 12-pulse configuration, but also more or less converter valves are conceivable, in which four is the lower limit, since there should be at least two said connecting members for connecting to transformers.

The case of a 12-pulse converter configuration for said high voltages will now be discussed for explaining the problems converters of this type are facing.

Said connecting members are in known converters of this type arranged on one side of said converter valves for leading out from the converter to transformers to transformers normally arranged outside a valve hall housing said converters. High power transformers need to be of single phase two winding type due to transport limitations, since they will otherwise be that large and heavy that it is difficult to find vehicles for transporting them and/or they may be too heavy for being allowed to be transported on roads. This means that a 12-pulse converter configuration requires six one-phase two-winding transformers. These have for such a known converter to be arranged on one side of the converter in a long row side by side. By having all transformers on one long side of such a valve hall building a lot of electrical connections will be concentrated on this side. Electrical insulation distance (air distance) between each connection is necessary and will need extra space and air. This also means that the converter valves are then mostly built as double valves, which means that they are arranged in columns of two superimposed valves, so that six such columns are arranged in a row in the 12-pulse configuration case. Such a converter configuration has a rather complicated electrical bus work between the converter and the transformers.

SUMMARY OF THE INVENTION

The object or the present invention is to provide a converter of the type defined in the introduction being simplified with respect to such converters already known.

This object is according to the invention obtained by providing such a converter with said connecting members on both of two opposite sides of said converter valves. This makes it possible to dramatically reduce the size of a valve hall enclosing the converter and simplify the electrical connection between the transformers and the converter, since the transformers may then be arranged on both sides of the converter. This means that the converter valves may be arranged in a more compact way, such as quadruple valves instead of double valves and still obtain that there is sufficient electrical insulation distance between connections to transformers, since these connections are fewer than before on each side of the converter. It is then advantageous to have half of said connecting members arranged on one side of said converter valves and a half on the other side thereof. Combining this with an arrangement of said valves in columns of twice as many converter valves means that the length of a said converter valve hall may be reduced to substantially the half while saving space at the same time as the electrical bus work between the converter and the transformers is simplified.

According to an embodiment of the invention the converter comprises a said series connection of at least four said converter valves arranged on top of each other in one column, and said connecting members for the AC-side connect to points of said series connection between every second current valve, such as between the first and second, the third and fourth and so on.

According to another embodiment of the invention said series connection of converter valves has four converter valves and one said connecting member for the AC-side on each of two opposite sides of said column. This means only one said connecting member on each of two opposite sides of the column of converter valves for four such converter valves.

According to another embodiment of the invention the converter comprises a plurality of said series connections of converter valves connected in parallel with each other, and the normal case is that it comprises three said series connections of converter valves connected in parallel with each other for providing for three phases on said AC-side. The converter may then comprise three said columns of four converter valves connected in series arranged in a row, and each column has one said connecting members to said AC-side on each of two opposite sides of said row. This means three connecting members on each side of said row instead of six for such a 12-pulse configuration of known converters.

According to another embodiment of the invention the converter comprises a plurality of surge arresters connected in series between said two DC-side ends of the converter valve series connection with one surge arrester connected in parallel with each converter valve, the series connection of surge arresters has a first part arranged on one side of said series connection of converter valves and a subsequent second part arranged on the opposite side of said series connection of converter valves, and said two parts are interconnected by a conductor leading from one said side to the other through a free space between two said converter valves. By providing such a free space between two subsequent converter valves of said series connection it is possible to change side of said series connection of surge arresters and by that change side for the arrangement of said connecting members leading out from the converter to the transformers for arranging such connecting members on both sides of the converter.

According to another embodiment of the invention each converter valve comprises a plurality of superimposed layers, comprising power semiconductors, and said free space is formed by making a distance between two subsequent of said converter valves of approximately half such a layer or one such layer. This constitutes an easy way to obtain a change of side of said series connection of surge arresters by simply omitting one layer or half such a layer, so that the total height of the column of superimposed converter valves will only increase slightly.

According to another embodiment of the invention the two DC-side connections to the opposite ends of said series connection of converter valves are also arranged on one of said opposite sides of the converter valves each. This counteracts the necessity of large dimensions of the converter in any direction due to a concentration of electrical connections on one side thereof. It is pointed out that said two opposite ends of the series connection of converter valves may be connected to a pole each of a high voltage transmission line or one of them may be connected to such a pole and the other to a neutral bus being earthed.

According to another embodiment of the invention the converter comprises a converter valve hall enclosing said converter valves and having lead-throughs in opposite walls thereof for connection to transformers outside said hall on opposite sides thereof. Such a converter valve hall may thanks to the arrangement of said connecting members on both sides of said converter and by that of said transformers on both sides of said hall be made compact while maintaining sufficient electrical insulation distances between connecting members and between transformers.

According to another embodiment of the invention the converter is adapted to convert voltages being on said DC-side of the converter above 50 kV, above 200 kV, above 400 kV or 600 kV-1 000 kV. The invention is the more interesting the higher said voltage is, although it may also be favourable for voltages being low in this context, which means for instance in the order of 200 kV. The invention is especially adapted for higher voltages in line/cable transmission systems and lower voltages in back-to-back applications.

The invention also relates to a converter station for connecting an AC-system to an HVDC transmission line provided with at least one converter according to the invention, a converter station for connecting an AC-system to another AC-system in a back-to-back application provided with at least one converter according to the invention as well as an HVDC (High Voltage Direct Current) transmission system having converter stations with at least one converter according to the invention. The invention also relates to a high voltage AC transmission system having a converter station with at least one converter according to the invention, a use of a converter according to the invention in a converter station of an HVDC transmission system, as well as a use of a converter according to the invention in a back-to-back converter station of a high voltage AC transmission system, and the results of the arrangement of such a converter and use thereof with respect to making constructions simpler and less space demanding and saving of costs appear from the discussion above of converters according to different embodiments of the invention.

Further advantages as well as advantageous features of the invention will appear from the following description of an embodiment of the invention.

BRIEF DESCRIPTION OF THE DRAWINGS

With reference to the appended drawings, below follows a specific description of a converter according to the prior art and a converter according to an embodiment of the present invention. In the drawings:

FIG. 1 is a very schematic view illustrating an HVDC (High Voltage Direct Current) transmission system with converter stations, which may or may not include a converter according to the invention, FIG. 2 is a very schematic view illustrating a known converter with a 12-pulse configuration, and FIG. 3 is a simplified end view of a converter according to an embodiment of the present invention.

BRIEF DESCRIPTION OF A CONVERTER ACCORDING TO THE PRIOR ART

Figure 4:
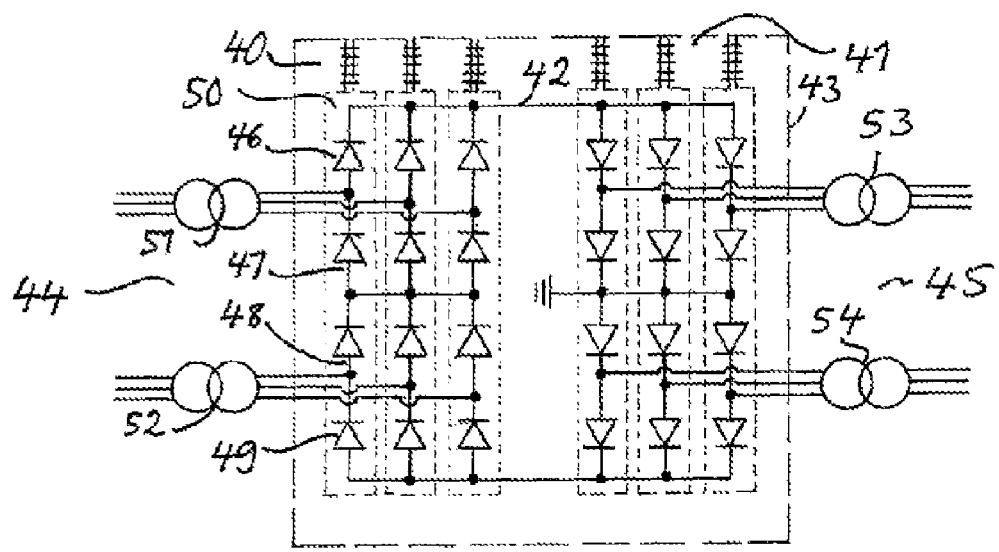
FIG. 4 is a simplified view showing a general construction of two known converters used in a back-to-back application.

FIG. 1 illustrates schematically a high voltage direct current transmission system having two converter stations 1, 2 interconnected by a high voltage direct current transmission line 3 of bipolar type having one pole 4 with positive polarity with respect to earth, for instance +800 kV, and one pole 5 with negative polarity with respect to earth, such as −800 kV. Each converter station has two converters 6, 7 having a DC-side thereof connected on one hand to a said pole on high potential and on the other to a DC neutral arrangement 8 being earthed. An AC-side of each converter is connected to transformers 9.

A known so called 12-pulse bridge converter for converting alternating voltage into direct voltage and vice versa in a converter station of an HVDC transmission system of this type is shown in FIG. 2. This converter has three series connections of four converter valves 10', 11', 12' and 13' each, and said series connections are connected in parallel with each other for connecting with opposite ends 14' and 15' to high potential and low potential of said DC-side, respectively. Each said series connection is here arranged in two columns having each two superimposed converter valves. It is shown how points between the two converter valves of each column are provided with members 16' for connecting them to a transformer 17' each, so that in this way six transformers are arranged on one side of the row of converter valve columns resulting in the problems discussed above.

DETAILED DESCRIPTION OF EMBODIMENTS OF THE INVENTION

In a view on one end of said row FIG. 3 illustrates schematically a converter according to an embodiment of the present invention. This is also a 12-pulse bridge converter having the series connection of four converter valves 10-13 arranged in one column on top of each other, so that the converter will have three such columns arranged in a row. Such a column is here shown to be insulated with respect to the roof 18 of a current valve hall by an insulation member 19. The DC-side of the converter is connected to said converter column on opposite sides thereof by a connection 20 to a pole of the HVDC transmission line and the connection 21 to a neutral bus of the converter station. Surge arresters 22-25 are connected in series between said DC-connections 20, 21 with one surge arrester connected in parallel with each converter valve for protection thereof against over-voltages. One part of the series connection of surge arresters, namely two of them, 22 and 23, is arranged on one side of the converter valve column and the other part on the other side of the column by being interconnected by a conductor 26 leading from one said side to the other through a free space 27 between two said converter valves 11, 12. Each converter valve comprises a plurality of superimposed layers comprising power semiconductors, and said free space 27 is preferably formed by leaving a distance between two subsequent converter valves of approximately half such a layer.

It is shown how members 16 connecting to points of the series connection of converter valves between subsequent converter valves may in this way be arranged on opposite sides 30, 31 of the converter for connecting to transformers 17 on opposite sides thereof resulting in the advantages described above.

FIG. 4 shows a further application in which the present invention is useful. This figure shows a known back-to-back application, in which two converters 40, 41 are connected by a DC link 42 and arranged in a converter hall 43. The alternating voltage may for instance on one side 44 have a frequency of 50 Hz and on the other side 45 a frequency of 60 Hz. Each converter has here three columns, one for each phase, each having four converter valves 46-49 as indicated for the column 50. The transformers 51-54 connected to the same converter are provided on the same side of the converter, and the converter hall 43 for this arrangement gets rather wide.

Figure 5:
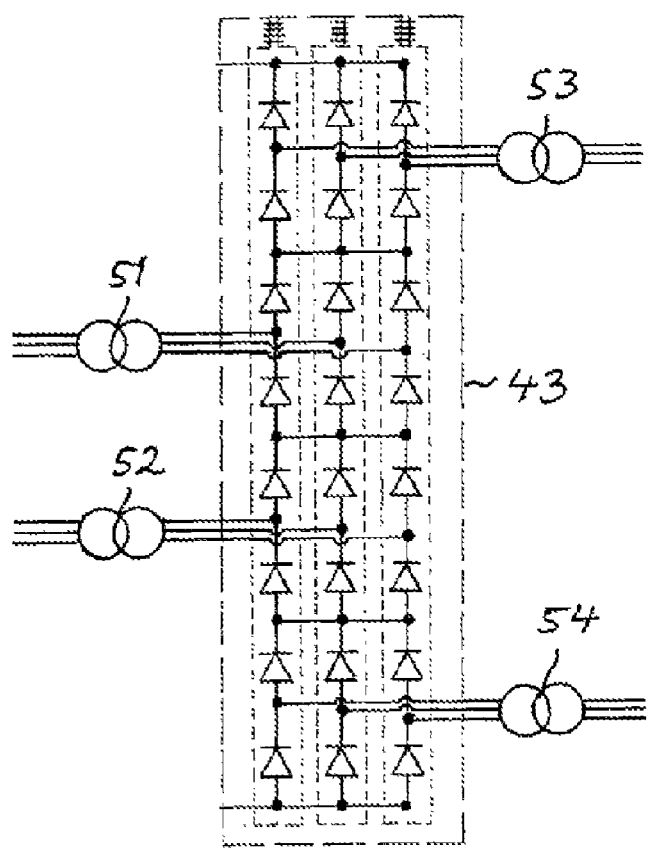
FIG. 5 is a view similar to FIG. 4 of a converter according to the invention used in a back-to-back application.

FIG. 5 shows a converter according to the invention used in a back-to-back application as the one according to FIG. 4. This converter uses octuple valves, i.e. eight converter valves in each column, and transformers 51-54 are arranged on both sides of the converter hall 43 by using the technique described above and illustrated in FIG. 3. This reduces the width of the valve hall considerably.

The invention is of course not in any way restricted to the embodiment described above, but many possibilities to modifications thereof would be apparent for a person with ordinary skill in the art without departing from the basic idea of the invention as defined in the appended claims.

The invention claimed is:

1. A converter for converting alternating voltage into direct voltage and conversely in a converter station of a high voltage transmission system, said converter comprising
   a series connection of a plurality of converter valves in a column, a DC-side of the converter being formed by opposite ends of said series connection of converter valves for connection to high potential and low potential, respectively, and
   a plurality of connecting members each interconnecting a connection point between two of said series connected converter valves of said column with a corresponding transformer, said plurality of connecting members thereby forming an AC side of the converter, wherein the converter comprises said connecting members on both of two opposite sides of said converter valves of said column.

2. The converter according to claim 1, wherein a half of said connecting members is arranged on one side of said converter valves and a half on the other side thereof.

3. The converter according to claim 1, wherein the converter comprises said series connection of at least four said converter valves arranged on top of each other in said column, and wherein said connecting members for the AC-side connects to points of said series connections between every second converter valve.

4. The converter according to claim 3, wherein said series connection of converter valves comprises four converter valves and one said connecting members for the AC-side on each of two opposite sides of said column.

5. The converter according to claim 4, wherein the converter comprises three said columns of four converter valves connected in series arranged in a row, and wherein each column comprises one said member connecting to said AC-side on each of two opposite sides of said row.

6. The converter according to claim 1, wherein the converter comprises a plurality of series connections of converter valves connected in parallel with each other, wherein each series connection is provided in a separate column.

7. The converter according to claim 6, wherein the converter comprises three said series connections of converter valves connected in parallel with each other for providing for three phases on said AC-side.

8. The converter according to claim 1, further comprising:
   a plurality of surge arresters connected in series between said two DC-side ends of the converter valve series connection with one surge arrester connected in parallel with each converter valve, wherein the series connection of surge arresters comprises a first part arranged on one side of said series connection of converter valves and a subsequent second part arranged on the opposite side of said series connection of converter valves, and wherein said two parts are interconnected by a conductor leading from one said side to the other through a free space between two said converter valves.

9. The converter according to claim 8, wherein each converter valve comprises a plurality of superimposed layers comprising power semiconductors, and wherein said free space is formed by making a distance between two subsequent of said converter valves of approximately half such a layer or one such layer.

10. The converter according to claim 1, wherein the two DC-side connections to the opposite ends of said series connection of converter valves are also arranged on one of said opposite sides of the converter valves each.

11. The converter according to claim 1, further comprising:
   a converter valve hall enclosing said converter valves and having lead-throughs in opposite walls thereof for connection to transformers outside said hall on opposite sides thereof.

12. The converter according to claim 1, wherein the converter is adapted to convert voltages being on said DC-side of the converter above 50 kV.

13. An HVDC transmission system, comprising:
   a converter station comprising a converter for converting alternating voltage into direct voltage and conversely, said converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a corresponding transformer, said plurality of connecting members thereby forming an AC side of the converter, wherein the converter comprises said connecting members on both of two opposite sides of said converter valves of said column.

14. A high voltage AC transmission system, comprising:
a back-to-back converter station comprising a converter for converting alternating voltage into direct voltage and conversely, said converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a corresponding transformer, said plurality of connecting members thereby forming an AC side of the converter, wherein the converter comprises said connecting members on both of two opposite sides of said converter valves of said column.

15. The converter according to claim 1, wherein the converter is adapted to convert voltages being on said DC-side of the converter above 200 kV.

16. The converter according to claim 1, wherein the converter is adapted to convert voltages being on said DC-side of the converter above 400 kV.

17. The converter according to claim 1, wherein the converter is adapted to convert voltages being on said DC-side of the converter of 600 kV-1 000 kV.

18. A converter station for connecting an AC-system to an HVDC transmission line, the converter station comprising: at least one converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a transformer, said plurality of connecting members thereby forming an AC side of the converter, connecting to an AC-side of the converter by each connecting to points of said series connection between subsequent said converter valves for leading out from the converter to transformers, wherein the converter comprises said connecting members on both of two opposite sides of said converter valves.

19. A converter station for connecting an AC-system to another AC-system in a back-to-back application, the converter station comprising:
at least one converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a transformer, said plurality of connecting members thereby forming an AC side of the converter, wherein the converter comprises said connecting members on both of two opposite sides of said converter valves of said column.

20. A high voltage direct current transmission system, comprising:
a plurality of converter stations comprising at least one converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a transformer, said plurality of connecting members thereby forming an AC side of the converter, wherein the converter comprises said connecting members on both of two opposite sides of said converter valves of said column.

21. A high voltage AC transmission system, comprising:
a converter station comprising at least one converter in a back-to-back application, the at least one converter comprising a series connection of a plurality of converter valves in a column, a DC-side of the converter being formed by opposite ends of said series connection of converter valves for connection to high potential and low potential, respectively, and a plurality of connecting members each interconnecting a connection point between two of said series connected converter valves of said column with a transformer, said plurality of connecting members thereby forming an AC side of the converter, wherein the converter comprises said connecting members on both of two opposite sides of said converter valves of said column.

* * * * *